United States Patent [19]

Stone

[11] 4,284,449
[45] Aug. 18, 1981

[54] METHOD FOR PRODUCING AN OPTICAL POWER SAMPLING DEVICE

[75] Inventor: Samuel M. Stone, Lynnfield, Mass.

[73] Assignee: GTE Laboratories Incorporated, Waltham, Mass.

[21] Appl. No.: 107,998

[22] Filed: Dec. 26, 1979

[51] Int. Cl.³ .......................... B32B 1/08; G02B 5/14; B29D 11/00
[52] U.S. Cl. ....................... 156/86; 156/153; 156/159; 156/266; 156/304.2; 156/304.5; 250/227; 350/96.15; 350/320
[58] Field of Search ............. 156/304.1, 304.2, 304.3, 156/304.5, 69, 158, 159, 286, 283, 284, 153, 64, 266, 86, 378, 379; 350/96.15, 96.16, 96.21, 320; 356/73.1; 51/283 R; 65/4 B; 250/227

[56] References Cited

FOREIGN PATENT DOCUMENTS 2020447  11/1979  United Kingdom ................. 350/96.16

OTHER PUBLICATIONS

Karr et al., "Effects of Beam Displacement . . . ", Applied Optics, pp. 2219-2223, vol. 17, No. 14, Jul. 15, 1978.
Lightwave Fiber Top, Karr et al., pp. 2215-2217, Applied Optics, vol. 17, No. 14, Jul. 15, 1978.
Simple Coupler Taps–Fiberoptic Cables, pp. 30-31, Electronics, Dec. 1973.

*Primary Examiner*—Michael W. Ball
*Attorney, Agent, or Firm*—Fred Fisher

[57] ABSTRACT

A method for producing a device for sampling optical power carried along a transmission medium.

Capillary tubing, cut to a fixed length, is machined to uniform outer diameter. Its ends are machined to a smaller diameter to accommodate end caps. The outer cylindrical surface is polished, and a length of optical fiber is inserted thereinto. The space between fiber and capillary is filled with transparent cement.

Caps are cemented to the tubing ends. Protective sleeving is slipped over the optical fibers, the sleeving being inserted within orifices in the caps and cemented thereto. Shrink tubing, covering the end caps and protective sleeving, is heated. The tubing, with fiber, is cut at an angle into two sections.

Both cut faces are ground and polished. A discontinuity in the refraction index occurs at the cut faces by coating a polished fiber face with material having a refractive index different than the fiber, and aligning and cementing both sections together at their interface; coating the exposed face with a partially transmissive, partially reflective, metallic film, and aligning and cementing both sections together at their interface; or providing an air gap for index discontinuity, and separating the sections by a small spacer and cementing the sections so as to allow a small air gap therebetween. A photodetector receives reflected optical power from a cut face.

22 Claims, 19 Drawing Figures

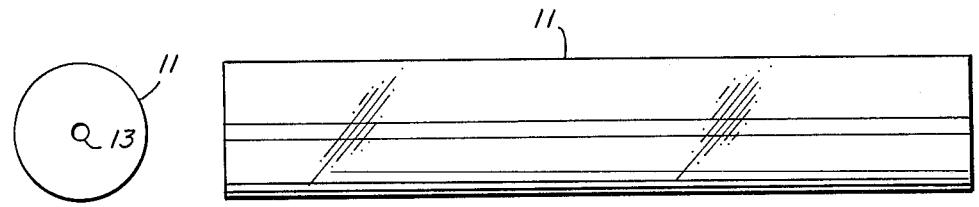
FIG. 1(a)  FIG. 1
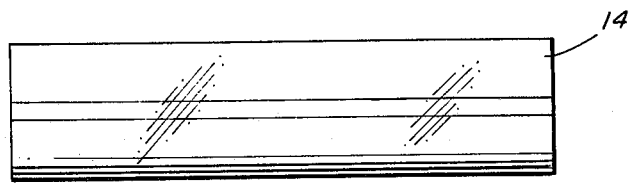
FIG. 2
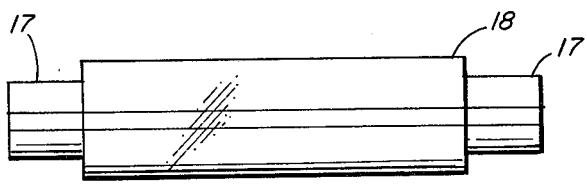
FIG. 3
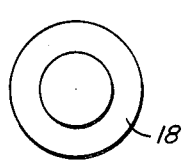 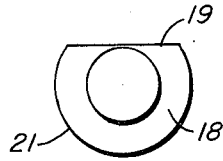 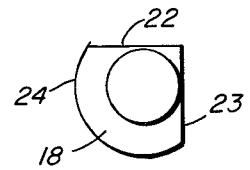
FIG. 4(a)  FIG. 4(b)  FIG. 4(c)

METHOD FOR PRODUCING AN OPTICAL POWER SAMPLING DEVICE

BACKGROUND OF THE INVENTION

1. Field of the Invention

This invention relates to a method for producing an optical power sampling device. Accordingly, it is a general object of this invention to provide new and improved methods of such character.

2. Description of the Prior Art

In optical communication systems, it is desirable to stabilize the output of an optical source against variations due to degradation during life or due to temperature changes. Stabilization is particularly needed for laser diodes, but may also be utilized for light emitting diodes.

To stabilize the output of these devices, a sample of the power carried along the transmission medium is needed to provide a signal input to a feedback control loop, which then adjusts the diode electrical bias current, and possibly the drive signal, to maintain either a constant average optical power or a constant peak optical signal amplitude.

A prior art method for sampling the optical output power of a diode laser makes use of the power radiating from the rear face of a laser chip. A disadvantage is that the power emitted from the rear face is not necessarily linearly proportional to the power coupled into the system waveguide (optical fiber). Even when each of two identical optical fibers are coupled to the front and rear faces of the laser, the optical modes coupled into each of the fibers are a function of their orientation with respect to the front and rear laser radiation patterns. It is extremely difficult in practice to achieve precisely the same alignment.

"Effects of beam displacement and front and back mistracking of junction lasers on lightwave transmitter output stability", by F. S. Chen, M. A. Karr, and P. W. Shumate, July 15, 1978/Vol. 17, No. 14/Applied Optics, pp. 2219-2223, discusses the tapping of an optical fiber for feedback control of a laser. In this referenced paper, the optical fiber tap, functioning as a beam splitter, extracts a portion of the guided optical power in the fiber. It consists of two fibers having angle-polished ends placed close to each other but separated by a small air gap. The glass-to-air interfaces reflect about 10% of the guided power away from the fiber axis, and this reflected light is intercepted by a P-I-N photodiode.

SUMMARY OF THE INVENTION

Another object of this invention is to provide a new and improved method of accurately, conveniently, and simply producing an optical power sampling device.

In accordance with an embodiment of this invention, a method for providing a device for sampling optical power carried along a transmission medium includes a number of steps:

Capillary tubing, whose inside diameter has been selected to be slightly larger than the diameter of the fiber to be used, is cut to a convenient length, consistent with obtaining good alignment in a V-block. The outside diameter of the cut tubing is machined to a uniform diameter over its length, maintaining the axis of the generated cylinder essentially coaxial with the axis of the bore. The ends of the capillary tubing are machined to a smaller diameter to accommodate end caps. The surface of the outer cylinder is then polished, and a length of optical fiber is inserted into the capillary tubing. The space between the fiber and the capillary is filled with a transparent cement.

Caps, each having an orifice for the passage of the optical fiber therethrough, are cemented to the ends of the cut tubing. Protective sleeving is slipped over the optical fibers, and the sleeving is inserted within the orifices of the end caps and cemented thereto. Shrink tubing is applied over the end caps and protective sleeving, and heated. The capillary tubing with the optical fiber is cut into two sections at an actue angle with respect to the principal axis of the tubing.

Both faces resulting from the cutting of the tubing and fiber are ground and polished. A discontinuity in the index of refraction is provided at the cut faces of the fiber. The sections are aligned and cemented in alignment with each other. A photodetector is positioned to receive optical power reflected from one of the cut faces.

In accordance with certain features of the invention, in lieu of polishing a portion, but not all, of the cylinder, any of the following is desirable: (1) polishing the entire outer cylindrical surface of the cylinder; (2) grinding and polishing a flat surface axially along the outer surface of the capillary cylinder while leaving the remainder of the cylinder in the ground condition; and (3) grinding two flat surfaces perpendicular to each other axially along the outer surface of the capillary cylinder and polishing at least one of the surfaces, while leaving the remainder of the cylinder in the ground condition.

In accordance with other features of the invention, the discontinuity in the index of refraction can be provided by either (1) coating at least one of the polished angled fiber faces with a material having a refractive index different than the fiber, or with multiple layers of alternating high and low index of refraction materials, and placing both sections in a V-block and cementing them together at the interface after aligning the sections on their common axis and angle; (2) coating the exposed face of at least one of the polished angled fiber faces with a very thin partially transmissive, partially reflective metallic film, and placing both sections in a V-block and cementing them together at the interface after aligning the sections on their common axis and angle; and (3) providing an air gap for index discontinuity, and separating the sections by a very small spacer and cementing the sections to either the spacer or to a third member, allowing a small air gap between both sections.

In accordance with still other features of the invention, a protective member is cemented to the resultant assemblage to provide added strength. The photodetector can be positioned in close proximity to the junction of the sections to receive the reflected optical power. A hole can be provided, along the path of a reflected beam, in the appropriate section with a waveguide or optical fiber cemented therein, with a photodetector coupled to the non-cemented end of the waveguide. The waveguide can be made substantially long so that photodetection occurs at a remote location.

BRIEF DESCRIPTION OF THE DRAWING

Other objects, advantages, and features of this invention, together with its construction and mode of operation, will become more apparent from the following specification, when read in conjunction with the accompanying drawing, in which the various figures illustrate steps in accordance with methods of practicing the invention, and wherein FIG. 1 is a side view of capillary tubing useful for embodiments of this invention;

FIG. 1(a) is an end view of the tubing shown in FIG. 1;

FIG. 2 is a side view of the tubing shown in FIG. 1 following a cutting step;

FIG. 3 is a side view of the cut tubing shown in FIG. 2 following another step;

FIG. 4(a) is an end view of the tubing shown in FIG. 3 following a subsequent step, in accordance with one embodiment of the invention;

FIG. 4(b) is an end view of the tubing shown in FIG. 3 following a subsequent step, in accordance with another embodiment of the invention;

FIG. 4(c) is an end view of the tubing shown in FIG. 3 following a subsequent step in accordance with yet another embodiment of the invention;

DESCRIPTION OF THE PREFERRED EMBODIMENTS

Through the practice of this invention, two polished, cut ends of an optical fiber are oriented and provided with a reflecting surface or surfaces at their interface to direct a portion of optical power to a photodetector to provide an input signal to a feedback loop. The precision of alignment minimizes throughput loss of the assemblage.

One type of optical fiber used in communications technology is approximately 5 mils diameter, with a core of approximately 2.5 mils. In order to maximize the effective throughput, input and output fibers should be accurately aligned.

To stabilize the output of an optical source, a sample of the power carried along an optical fiber is provided to a feedback control loop. Methods for so doing are set forth hereinbelow.

Referring to FIG. 1, a capillary tubing 11 of transparent material has a bore 13.

Figure 11:
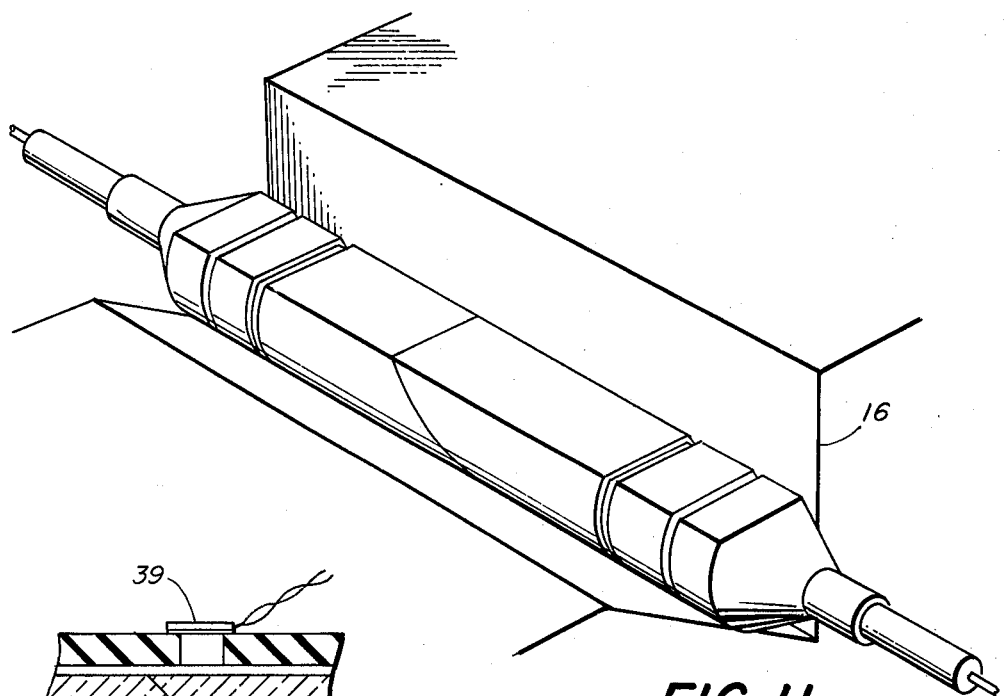
FIG. 11 is a perspective view of an alignment step for one embodiment of the invention.

The capillary tubing 11 is cut to a convenient length, (e.g., 1 or 2 inches), as illustrated by the cut tubing 14 of FIG. 2, consistent with obtaining good subsequent alignment in a V-block 16 (FIG. 11).

The outside diameter of the cut capillary tubing 14 is then ground to a uniform diameter (e.g., 0.230 inch, but not critical) over its length, maintaining the axis of the generated cylinder coaxial with that of the bore 13. End portions 17—17 of the ground tubing are ground to a reduced diameter to yield a ground, formed cylinder 18, as shown in the side view of FIG. 3.

At this stage, three different steps can take place:

Embodiment One

As depicted simply in the side view of FIG. 4(a), the formed cylinder 18 has its surface polished, either by mechanical means or by fire polish (i.e., heating the surface of the tubing until melting occurs), maintaining precise uniformity of the outside diameter.

Embodiment Two

Alternatively, as depicted in the side view of FIG. 4(b), the formed cylinder 18 is ground and polished to produce a flat surface 19 axially along the cylinder 18, leaving the remainder 21 of the cylinder 18 in the ground condition.

Embodiment Three

Optionally, as depicted in the side view of FIG. 4(c), two flat surfaces 22, 23 are formed axially along the cylinder 18 by grinding, and polishing at least one surface, leaving the remainder 24 in the ground condition. The two surfaces 22, 23 on the cylinder 18 form an angle with respect to each other so that they can fit into a V-block. If the angle that forms a V-block is at 90°, then the two surfaces 22, 23 should be at 90°; if the V-block angle is 60°, then the angle formed by the surfaces 22, 23 should be 60°. The surface where the beam is to emerge should be polished; the other one need not.

Figure 5:
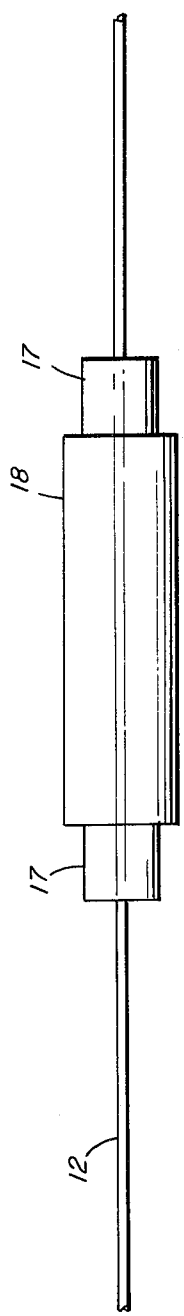
FIG. 5 is a side view of the cut tubing following the insertion and cementing of optical fiber therewithin, in accordance with the invention.

The subsequent step, in either of the foregoing embodiments, is the insertion of an optical fiber 12 into the formed cylinder 18. The fiber 12 (FIG. 5) is then cemented in place. The length of the fiber 12 is not critical; lengths from 0.5 to 2.0 meters are convenient.

Figure 6:
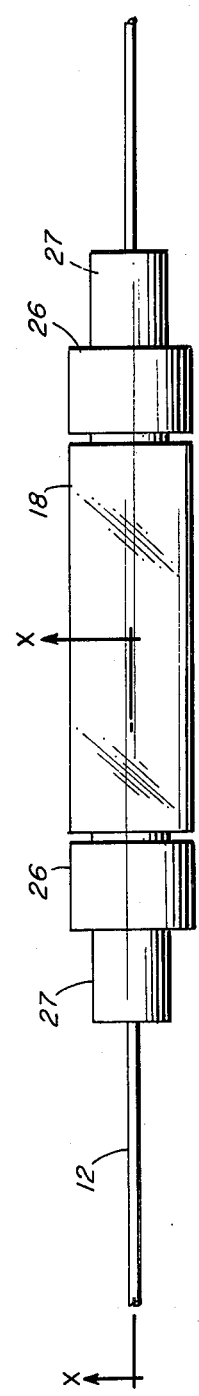
FIG. 6 is a side view of the assemblage shown in FIG. 5 following the addition of end caps thereto, in accordance with an embodiment of the invention.

Referring to FIG. 6, metal or plastic end caps 26—26 are cemented, respectively, onto the ends 17—17 of the formed tubing 18. The outer diameters of the end caps 26—26 are preferably smaller than the outer diameter of the tubing 18 so that the end caps 26—26 do not rest on the V-block. However, when the V-block has a length shorter than that of the length of the outer diameter cylinder of cut tubing 18, the end caps 26—26 can have larger diameters. The end caps 26—26 have recessed portions 27—27 with an orifice 28, respectively, to permit the optical fiber 12, together with protective sleeving 29, to pass therethrough.

Figure 7:
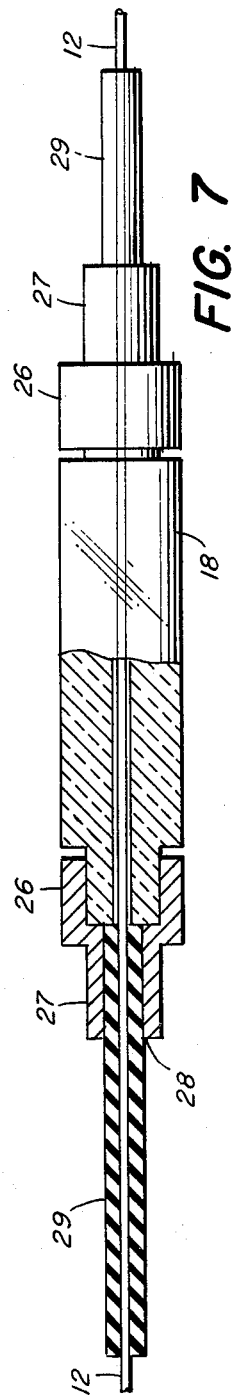
FIG. 7 is a side view, partly in section taken along the line X—X of FIG. 6, following an additional step in accordance with an embodiment of the invention.

Referring to FIG. 7, protective sleeving 29—29 is slipped over the ends of the optical fiber 12 and into the orifices 28 of the end caps 26. The sleeving is then cemented to the end caps 26—26.

Figure 8:
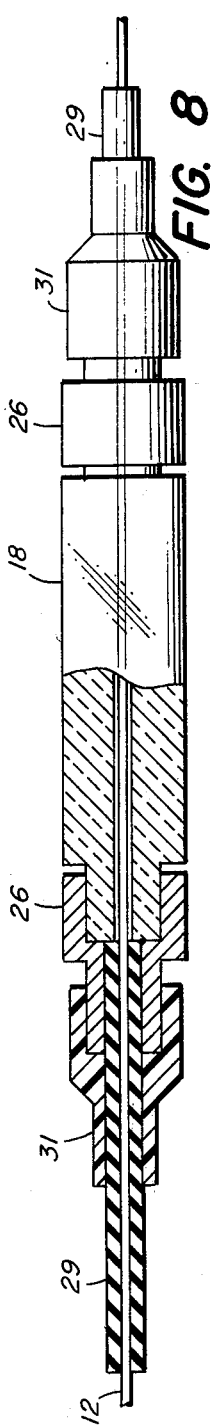
FIG. 8 is a side view, partly in section taken along the line X—X of FIG. 6, following yet another step in accordance with an embodiment of the invention.

As shown diagrammatically in FIG. 8, shrink tubing 31—31 is applied over recessed portions 27—27 of the end caps 26—26 and the protective tubing 29—29, and then heated. The purpose of this tubing is to prevent sharp bends of the fiber 12 to minimize the probability of breaking the fiber and to minimize waveguide losses associated with sharp bends.

Figure 9:
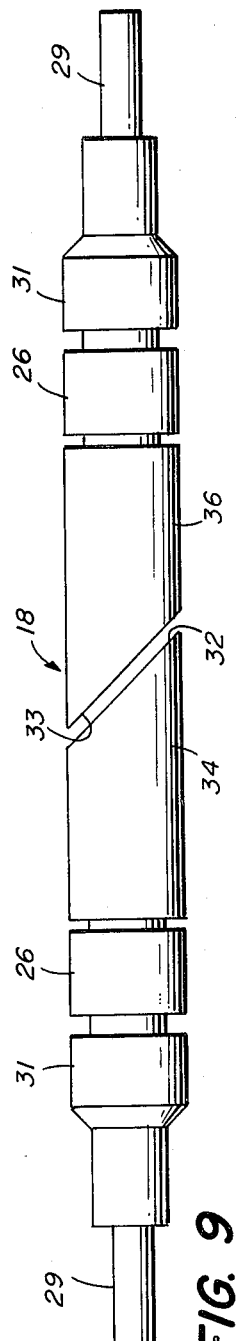
FIG. 9 is a side view following a step of cutting the assemblage shown in FIG. 8 into two sections.

Referring to FIG. 9, the capillary tubing 18, with its fiber 12 therewithin, is then cut at a convenient angle α (45° preferred) with respect to the central axis. In those embodiments in which a flat 19, 22, or 23 has been ground and polished on the cylinder, a normal to the plane of the cut and a normal to the plane of the flat should preferably, but not necessarily, lie in the same or parallel planes so as to simplify alignment. The two faces 32, 33 of the resulting cut sections 34, 36 are ground and polished, maintaining the same angle with respect to the central axis on each section 34, 36.

At the next stage, there are various options:

Option One

Figure 10:
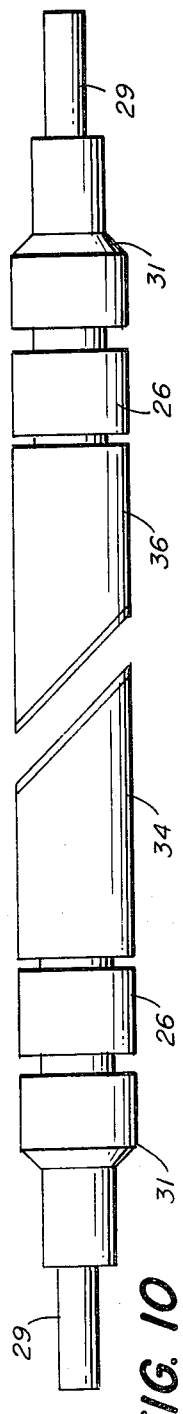
FIG. 10 is a side view of the assemblage of FIG. 9, following an additional step, showing a discontinuity in the index of refraction at the cut faces of the optical fiber.

Referring to FIG. 10, the angled ends of one or both fibers in sections 34, 36 as well as all or part of the remainder of faces 32, 33 are coated with transparent material, such as lacquer or a cement, having an index of refraction different than that of the optical fiber 12. One or both angled fiber ends or all or part of faces 32, 33 can be coated with multiple layers of high and low index material. A discontinuity occurs at the face 32 and/or 33 of the optical fiber, providing for reflection to occur.

Option Two

One or both surfaces 32, 33 are coated with a very thin (measured in angstroms), partially transmissive, partially reflective metallic film such as aluminum, silver, gold, or the like.

Option Three

The surfaces 32, 33 are not coated, but an air-to-glass interface is provided. With the latter option, when a quartz fiber is used, the 45° angle referred to hereinabove cannot be used because it is smaller than the critical angle of the optical fiber 12 (46.5°). Angles between 46.5° and 81° can be used (preferably 65°). The percentage of the optical power reflected out is a function of the angle. Angles larger than 81° cause the reflected optical beam to be trapped by the waveguide.

When either Option One or Two as set forth hereinabove are used, both sections 34, 36 of the capillary tube 18 are placed into a V-block 16, as shown in FIG. 11, and cemented together at their interface after aligning them on their common axis and angle. When a flat has been ground and polished on the cylinder, an auto-collimator or other means is used to align both parts of the flat plane into a common plane.

When Option Three is used, an air gap is used for the index discontinuity. The two pieces can be separated by a spacer measured in microns and the three pieces can be cemented to each other. When a third support member is used, the two pieces can be cemented to the third member after providing a small air gap between the two sections 32, 36, or a spacer can be used to establish the air gap. The spacer in either case must allow free passage of the optical beam.

Figure 12:
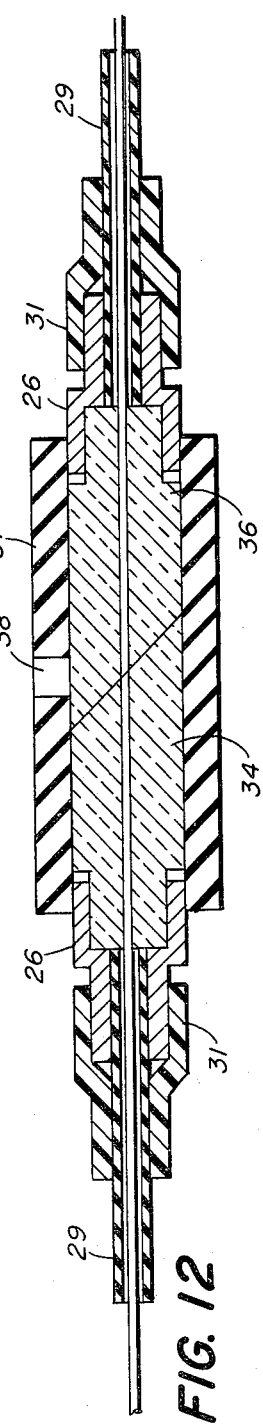
FIG. 12 is a cross-sectional side view showing a protective member affixed to the assemblage in accordance with a particular embodiment of the invention.
Figure 15B:
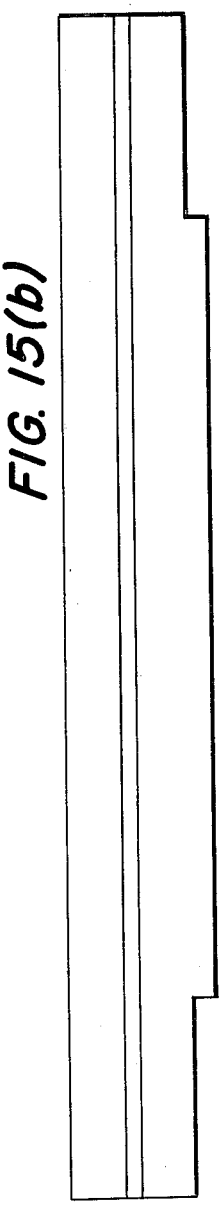
FIGS. 15(a) and 15(b) are end and side views of capillary tubing described at Embodiment Three of the invention.
Figure 15A:
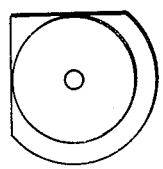

Referring to FIG. 12, a protective tube 37 is cemented to the assembly to provide added strength after removal from the V-block. The protective tube 37 has an aperture 38 therewithin to permit the passage of the reflected beam from the optical fiber 12. The protective tube 37 can be a partial cylinder, such as a half cylinder or three-quarters of a cylinder.

Figure 13:
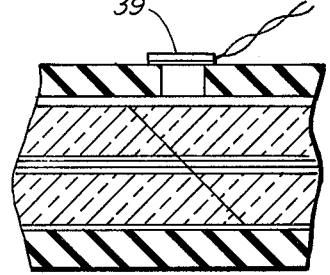
FIG. 13 is a partial sectional view illustrating the proximate positioning of a photodetector to the assemblage in accordance with an embodiment of the invention.
Figure 14:
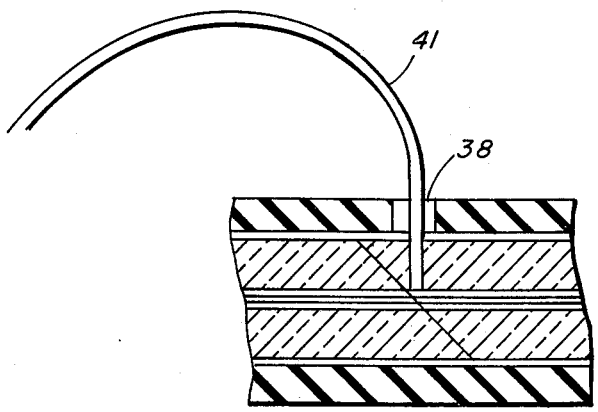
FIG. 14 is a partial sectional view illustrating a substantially long waveguide so that photodetection can occur at a remote location, in accordance with another embodiment of the invention.

Referring to the sectional view of FIG. 13, a photodetector 39 is then positioned to receive the optical power reflected from the interface of the sliced optical fiber 12. Alternatively, as depicted in FIG. 14, a waveguide can be coupled to receive the reflected optical power and transmit the reflected light to a photodetector at a remote location.

The percentage of optical power reflected away from the optical fiber 12 can be made very small by using a coating having a very small difference in refractive index from that of the optical fiber 12, or it can be made larger by increasing the index difference and it can be made very large by applying multiple layers of alternating high and low index materials. In the case where an air interface is used, the percentage of optical power reflected out is determined by the angle α (FIG. 9).

By providing a hole 38 in the protective tube 37 in the path of the reflected beam and cementing a waveguide such as an optical fiber or a rod 41 therein, the reflected beam can be guided out and collected by a small area detector. This arrangement can be used for a duplex communication system for bi-directional transmission on a single fiber.

The effect of polarization on reflectivity at a surface at other than normal incidence is useful to minimize the throughput loss in the transmitting direction and to maximize the reflected power in the receiving direction. The polarization direction of the laser source is oriented in a plane normal to the reflecting surface. The index of refraction of the coating and the angle of the cut are selected to minimize reflection at the interface in the transmission direction. The polarization direction is oriented in the plane of the reflecting surface of the power splitter at the receiving end; the index of refraction and the cut angle are chosen to achieve a large reflectivity compatible with transmitter requirements.

What is claimed is:

1. A method for providing a device for sampling optical power carried along a transmission medium comprising:
    a. cutting capillary tubing to a convenient length, consistent with obtaining good alignment in a V-block;
    b. machining the outside diameter of the cut capillary tubing to a uniform diameter over its length, then machining the ends of said tubing to a smaller diameter to accommodate end caps, maintaining the axis of the generated cylinders essentially coaxial with the axis of the bore;
    c. polishing a portion of said cylinder;
    d. inserting a length of optical fiber into said cut capillary tubing;
    e. cementing said fiber into said cut tubing;
    f. cementing end caps, each having an orifice for the passage of said optical fiber therethrough, to ends of said cut tubing;
    g. slipping protective sleeving over said optical fiber so that said sleeving is inserted within said orifices of said end caps;
    h. cementing said protective sleeving to said end caps;
    i. applying shrink tubing over said end caps and protective sleeving;
    k. heating said shrink tubing;

l. cutting said capillary tubing with said fiber into two sections at an acute angle with respect to the principal axis of said capillary tubing;

m. grinding and polishing both faces resulting from said cutting of said capillary tube with said fiber;

n. providing for a discontinuity in the index of refraction at the cut faces of said fiber;

o. aligning said sections and cementing said sections in alignment with each other; and p. positioning a photodetector to receive optical power reflected from one of said cut faces.

2. The method as recited in claim 1 wherein said convenient length is in the range of one to two inches.

3. The method as recited in claim 1 wherein said uniform diameter is approximately 0.230 inch.

4. The method as recited in claim 1 wherein said step c comprises polishing the outer cylindrical surface of said cylinder.

5. The method as recited in claim 1 wherein said step c comprises machining and polishing a flat surface axially along the outer surface of said capillary cylinder while leaving the remainder of said cylinder in the ground condition.

6. The method as recited in claim 5 wherein a normal to the plane of the cut resulting from step l and a normal to said flat surface lies in the same plane or parallel planes.

7. The method as recited in claim 1 wherein said step c comprises machining two flat surfaces perpendicular to each other axially along the outer surface of said capillary cylinder, polishing at least one surface, while leaving the remainder of said cylinder in the ground condition.

8. The method as recited in claim 7 wherein a normal to the plane of the cut resulting from step l and a normal to one of said two flat surfaces lies in the same plane or parallel planes.

9. The method as recited in claim 1 wherein said end caps have a diameter which does not exceed the outer diameter of said capillary cylinder.

10. The method as recited in claim 1 wherein said acute angle is 45°.

11. The method as recited in claim 1 wherein said acute angle is in the range of 46.5° to 81°.

12. The method as recited in claim 1 wherein said acute angle is 65°.

13. The method as recited in claim 1 wherein said steps n and o comprise:

n. coating the exposed face of at least one of said sections with at least one material having a refractive index different than said fiber, thereby providing for at least one discontinuity in the index of refraction at the cut faces of said fiber; and o. placing both of said sections in a V-block and cementing them together at the interface after aligning said sections on their common axis and angle, whereby said sections are aligned and cemented in alignment with each other.

14. The method as recited in claim 1 wherein said steps n and o comprise:

n. coating the exposed face of at least one of said sections with a multilayer dielectric coating having alternating high and low indices of refraction, thereby providing a partially reflecting surface; and o. placing both of said sections in a V-block and cementing them together at the interface after aligning said sections on their common axis and angle, whereby said sections are aligned and cemented in alignment with each other.

15. The method as recited in claim 1 wherein said steps n and o comprise:

n. coating the exposed face of at least one of said sections with a very thin, partially transmissive, partially reflective, metallic film, thereby providing for a discontinuity in the index of refraction at the cut faces of said fiber; and o. placing both of said sections in a V-block and cementing them together at the interface after aligning said sections on their common axis and angle, whereby said sections are aligned and cemented in alignment with each other.

16. The method as recited in claim 15 wherein said metallic film is selected from the group including aluminum, silver, and gold.

17. The method as recited in claim 1 wherein said steps n and o comprise:

n. providing an air gap for index discontinuity, so that a discontinuity exists in the index of refraction at the cut faces of said fiber; and o. separating said sections by a very thin, apertured spacer and cementing said sections to either said spacer or to a third member after allowing a small air gap between both said sections, whereby said sections are aligned and cemented in alignment with each other.

18. The method as recited in claim 1 further comprising a protective member cemented to said device for added strength of the resultant assembly.

19. The method as recited in claim 1 wherein said photodetector is positioned in close proximity to the juncture of said sections to receive the optical power reflected from one of said cut faces.

20. The method as recited in claim 1 wherein step p comprises:

p. providing a hole in the path of a reflected beam in the appropriate section, cementing within said hole a waveguide, and coupling a photodetector to the non-cemented end of said waveguide.

21. The method as recited in claim 20 wherein said waveguide is either an optical fiber or rod.

22. The method as recited in claim 20 wherein said waveguide is substantially long so that photodetection occurs at a remote location.

* * * * *